US012079876B1

(12) United States Patent
Parker et al.

(10) Patent No.: US 12,079,876 B1
(45) Date of Patent: Sep. 3, 2024

(54) DEVICE SENSING

(71) Applicant: Allstate Insurance Company, Northbrook, IL (US)

(72) Inventors: Carolyn Parker, Libertyville, IL (US); Robert H. Johnson, Hoffman Estates, IL (US); Nicholas A. Suizzo, Cody, WY (US); Rothana Srey, Dekalb, IL (US); Sean P. Willett, Chicago, IL (US); Regina Madigan, Mountain View, CA (US); Nan Zhang, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 160 days.

(21) Appl. No.: 17/320,683

(22) Filed: May 14, 2021

Related U.S. Application Data

(62) Division of application No. 16/559,200, filed on Sep. 3, 2019, now Pat. No. 11,042,945, which is a division of application No. 14/186,222, filed on Feb. 21, 2014, now Pat. No. 10,430,887.

(51) Int. Cl.
*G06Q 40/08* (2012.01)
*G06Q 40/00* (2023.01)

(52) U.S. Cl.
CPC .............. *G06Q 40/08* (2013.01); *G06Q 40/00* (2013.01)

(58) Field of Classification Search
CPC ........ G06Q 40/08; G06Q 40/02; G06Q 40/06; G06Q 10/0635
USPC .................................... 705/4, 35, 36 R, 7.28
See application file for complete search history.

(56) References Cited

U.S. PATENT DOCUMENTS

| 5,523,942 | A | * | 6/1996 | Tyler | ...................... | G06Q 40/02 715/255 |
| 5,648,724 | A | | 7/1997 | Yankielun et al. | | |
| 5,818,340 | A | | 10/1998 | Yankielun et al. | | |
| 5,884,274 | A | * | 3/1999 | Walker | .................... | G06Q 40/03 235/379 |
| 5,893,072 | A | * | 4/1999 | Zizzamia | ............... | G06Q 10/02 705/5 |
| 5,970,464 | A | * | 10/1999 | Apte | ...................... | G06Q 40/08 705/4 |

(Continued)

FOREIGN PATENT DOCUMENTS

| AU | 2010204729 A1 | 9/2011 |
| AU | 2010249515 | 1/2012 |

(Continued)

OTHER PUBLICATIONS

English translation of JP-S61191944-U (Year: 1986).*

(Continued)

*Primary Examiner* — Kelly S. Campen
(74) *Attorney, Agent, or Firm* — Dinsmore & Shohl LLP

(57) ABSTRACT

Systems, methods, apparatuses, and computer-readable media for receiving data from one or more sensors associated with one or more home devices of a user, such as appliances, home systems, etc., receiving data from one or more sensors associated with a vehicle of the user, and/or receiving data associated with a lifestyle of the user are presented. In some examples, the data may aggregated and analyzed to assess risk associated with the user in order to determine or adjust an insurance rate, premium, and/or incentive.

24 Claims, 9 Drawing Sheets

(56) References Cited

U.S. PATENT DOCUMENTS

| | | | |
|---|---|---|---|
| 6,009,402 A * | 12/1999 | Whitworth | G06Q 40/08 |
| | | | 705/400 |
| 6,113,493 A * | 9/2000 | Walker | G07F 17/40 |
| | | | 463/20 |
| 6,128,598 A * | 10/2000 | Walker | G06Q 40/03 |
| | | | 235/379 |
| 6,529,723 B1 | 3/2003 | Bentley | |
| 6,552,647 B1 | 4/2003 | Thiessen et al. | |
| 6,561,903 B2 * | 5/2003 | Walker | G07F 17/3244 |
| | | | 463/20 |
| 6,575,234 B2 | 6/2003 | Nelson | |
| 6,583,720 B1 | 6/2003 | Quigley | |
| 6,684,190 B1 * | 1/2004 | Powers | G06Q 40/06 |
| | | | 705/36 R |
| 6,823,258 B2 * | 11/2004 | Ukai | G01S 5/0027 |
| | | | 340/436 |
| 6,853,958 B1 | 2/2005 | Turin et al. | |
| 6,950,801 B2 | 9/2005 | Brookes et al. | |
| 6,995,676 B2 | 2/2006 | Amacher | |
| 7,088,239 B2 | 8/2006 | Basinger et al. | |
| 7,203,654 B2 | 4/2007 | Menendez | |
| 7,230,528 B2 | 6/2007 | Kates | |
| 7,243,050 B2 | 7/2007 | Armstrong | |
| 7,263,450 B2 | 8/2007 | Hunter | |
| 7,292,155 B2 | 11/2007 | Vokey et al. | |
| 7,336,168 B2 | 2/2008 | Kates | |
| 7,339,483 B1 | 3/2008 | Farmer | |
| 7,467,065 B2 | 12/2008 | Neel et al. | |
| 7,605,696 B2 | 10/2009 | Quatro | |
| 7,610,210 B2 | 10/2009 | Helitzer et al. | |
| 7,630,986 B1 | 12/2009 | Herz et al. | |
| 7,688,215 B2 | 3/2010 | Vokey et al. | |
| 7,711,584 B2 | 5/2010 | Helitzer et al. | |
| 7,716,077 B1 | 5/2010 | Mikurak | |
| 7,769,608 B1 | 8/2010 | Woll et al. | |
| 7,873,527 B2 | 1/2011 | Dordick et al. | |
| 7,941,330 B1 | 5/2011 | Buentello et al. | |
| 8,036,160 B1 * | 10/2011 | Oakes, III | G06Q 30/02 |
| | | | 370/328 |
| 8,041,636 B1 | 10/2011 | Hunter et al. | |
| 8,046,244 B1 | 10/2011 | Yager et al. | |
| 8,077,927 B1 | 12/2011 | Maltby, II | |
| 8,106,769 B1 * | 1/2012 | Maroney | G06Q 10/10 |
| | | | 340/540 |
| 8,145,578 B2 | 3/2012 | Pershing et al. | |
| 8,265,964 B2 | 9/2012 | Read et al. | |
| 8,271,303 B2 | 9/2012 | Helitzer et al. | |
| 8,271,308 B2 | 9/2012 | Winkler | |
| 8,280,633 B1 | 10/2012 | Eldering et al. | |
| 8,289,160 B1 | 10/2012 | Billman | |
| 8,319,508 B2 | 11/2012 | Vokey | |
| 8,340,997 B2 | 12/2012 | Vandrilla et al. | |
| 8,359,211 B2 | 1/2013 | English et al. | |
| 8,364,609 B2 | 1/2013 | Ozog | |
| 8,374,729 B2 | 2/2013 | Chapel et al. | |
| 8,378,808 B1 | 2/2013 | Gwaltney | |
| 8,384,886 B2 | 2/2013 | Richardson et al. | |
| 8,400,299 B1 | 3/2013 | Maroney et al. | |
| 8,401,877 B2 | 3/2013 | Salvagio | |
| 8,401,896 B2 | 3/2013 | Wargin et al. | |
| 8,424,095 B2 | 4/2013 | Masuoka et al. | |
| 8,432,117 B2 | 4/2013 | Berman et al. | |
| 8,447,631 B2 | 5/2013 | Ren et al. | |
| 8,599,008 B2 * | 12/2013 | Watson | H04L 43/0817 |
| | | | 340/5.1 |
| 8,649,987 B2 | 2/2014 | Steenberg et al. | |
| 8,749,381 B1 | 6/2014 | Maroney et al. | |
| 8,760,258 B2 | 6/2014 | Marriam et al. | |
| 8,924,241 B2 | 12/2014 | Grosso | |
| 9,017,256 B2 * | 4/2015 | Gottesman | A61B 5/486 |
| | | | 600/300 |
| 9,426,293 B1 * | 8/2016 | Oakes, III | H04M 3/5235 |
| 2002/0010599 A1 | 1/2002 | Levison | |
| 2002/0055861 A1 | 5/2002 | King et al. | |
| 2002/0095269 A1 | 7/2002 | Natalini et al. | |
| 2002/0128882 A1 | 9/2002 | Nakagawa et al. | |
| 2004/0153362 A1 | 8/2004 | Bauer et al. | |
| 2004/0168086 A1 | 8/2004 | Young et al. | |
| 2005/0267900 A1 | 12/2005 | Ahmed et al. | |
| 2006/0033625 A1 | 2/2006 | Johnson et al. | |
| 2006/0143056 A1 | 6/2006 | Taylor et al. | |
| 2006/0210753 A1 | 9/2006 | Kadlec | |
| 2007/0063075 A1 | 3/2007 | Kaplowitz | |
| 2007/0072541 A1 | 3/2007 | Daniels et al. | |
| 2007/0139191 A1 | 6/2007 | Quatro | |
| 2007/0258827 A1 | 11/2007 | Gierke | |
| 2007/0282639 A1 | 12/2007 | Leszuk et al. | |
| 2008/0015906 A1 | 1/2008 | Fox | |
| 2008/0055096 A1 | 3/2008 | Aylward | |
| 2008/0058740 A1 | 3/2008 | Sullivan et al. | |
| 2008/0065427 A1 | 3/2008 | Helitzer et al. | |
| 2008/0234878 A1 | 9/2008 | Joao | |
| 2008/0319786 A1 | 12/2008 | Stivoric et al. | |
| 2009/0037230 A1 | 2/2009 | Tracy et al. | |
| 2009/0157437 A1 | 6/2009 | Becerra et al. | |
| 2009/0265193 A1 | 10/2009 | Collins et al. | |
| 2010/0042442 A1 | 2/2010 | Seitomer et al. | |
| 2010/0057544 A1 | 3/2010 | Tarbell et al. | |
| 2010/0082174 A1 | 4/2010 | Weaver | |
| 2010/0145734 A1 | 6/2010 | Becerra et al. | |
| 2010/0153140 A1 | 6/2010 | Helitzer et al. | |
| 2010/0174566 A1 | 7/2010 | Helitzer et al. | |
| 2010/0217642 A1 | 8/2010 | Crubtree et al. | |
| 2010/0225341 A1 | 9/2010 | Burrows et al. | |
| 2010/0228588 A1 | 9/2010 | Nielsen et al. | |
| 2010/0235198 A1 | 9/2010 | Fini et al. | |
| 2010/0277315 A1 | 11/2010 | Cohn et al. | |
| 2011/0040666 A1 | 2/2011 | Crabtree et al. | |
| 2011/0161118 A1 | 6/2011 | Borden et al. | |
| 2011/0161119 A1 | 6/2011 | Collins | |
| 2011/0191125 A1 | 8/2011 | Patton | |
| 2011/0217681 A1 | 9/2011 | Krejcarek | |
| 2011/0251807 A1 * | 10/2011 | Rada | G01D 4/00 |
| | | | 702/61 |
| 2011/0251868 A1 | 10/2011 | Mikurak | |
| 2011/0270773 A1 | 11/2011 | Siekman et al. | |
| 2011/0311370 A1 | 12/2011 | Sloss et al. | |
| 2012/0016695 A1 | 1/2012 | Bernard et al. | |
| 2012/0071731 A1 * | 3/2012 | Gottesman | A61B 5/7282 |
| | | | 600/301 |
| 2012/0101852 A1 | 4/2012 | Albert | |
| 2012/0109692 A1 | 5/2012 | Collins et al. | |
| 2012/0123806 A1 | 5/2012 | Schumann, Jr. et al. | |
| 2012/0173290 A1 * | 7/2012 | Collins | G06Q 40/08 |
| | | | 705/4 |
| 2012/0188080 A1 | 7/2012 | Haupt et al. | |
| 2012/0209442 A1 | 8/2012 | Ree | |
| 2012/0223965 A1 | 9/2012 | Pershing | |
| 2012/0233012 A1 | 9/2012 | Scruton et al. | |
| 2012/0239581 A1 | 9/2012 | Mosher | |
| 2012/0259666 A1 | 10/2012 | Collopy et al. | |
| 2012/0259722 A1 | 10/2012 | Mikurak | |
| 2012/0280814 A1 | 11/2012 | Beale et al. | |
| 2012/0284058 A1 | 11/2012 | Varanasi et al. | |
| 2012/0290333 A1 | 11/2012 | Birchall | |
| 2012/0310854 A1 | 12/2012 | Cova et al. | |
| 2012/0330690 A1 | 12/2012 | Goslinga et al. | |
| 2013/0006676 A1 | 1/2013 | Helitzer et al. | |
| 2013/0020098 A1 | 1/2013 | Bui | |
| 2013/0024029 A1 | 1/2013 | Tran et al. | |
| 2013/0030845 A1 | 1/2013 | Brown | |
| 2013/0055661 A1 | 3/2013 | McGillycuddy | |
| 2013/0096954 A1 | 4/2013 | Bodas | |
| 2013/0103416 A1 | 4/2013 | Amigo et al. | |
| 2013/0103433 A1 | 4/2013 | Corben et al. | |
| 2013/0144658 A1 | 6/2013 | Schnabolk et al. | |
| 2013/0201018 A1 | 8/2013 | Horstemeyer et al. | |
| 2013/0297353 A1 | 11/2013 | Strange et al. | |
| 2014/0136242 A1 * | 5/2014 | Weekes | G06Q 40/08 |
| | | | 705/4 |
| 2014/0167969 A1 | 6/2014 | Wedig et al. | |
| 2014/0180725 A1 * | 6/2014 | Ton-That | G06Q 10/10 |
| | | | 705/4 |

(56) References Cited

U.S. PATENT DOCUMENTS

| | | | | |
|---|---|---|---|---|
| 2014/0201315 A1* | 7/2014 | Jacob | ............... | H04L 41/16 709/217 |
| 2014/0202243 A1 | 7/2014 | Leonard et al. | | |
| 2014/0207497 A1* | 7/2014 | Collins | ............ | G06Q 40/08 705/4 |
| 2014/0257862 A1 | 9/2014 | Billman et al. | | |
| 2014/0266287 A1 | 9/2014 | Reeder, III | | |
| 2015/0039466 A1 | 2/2015 | Skinner et al. | | |
| 2015/0112543 A1* | 4/2015 | Binion | ............ | G07C 5/008 701/32.2 |
| 2015/0112545 A1* | 4/2015 | Binion | ............ | G07C 5/12 701/1 |
| 2015/0112730 A1* | 4/2015 | Binion | ............ | G07C 5/008 705/4 |
| 2015/0112731 A1* | 4/2015 | Binion | ............ | G06Q 40/08 705/4 |
| 2015/0134369 A1* | 5/2015 | Sakata | ............ | G09B 19/0084 434/236 |
| 2015/0161538 A1* | 6/2015 | Matus | ............ | G06Q 40/08 705/4 |
| 2015/0187014 A1* | 7/2015 | Adams | ............ | G06Q 40/08 705/4 |
| 2015/0208986 A1* | 7/2015 | Gottesman | ............ | A61B 5/486 600/301 |
| 2015/0254781 A1* | 9/2015 | Binion | ............ | B60W 40/10 701/32.2 |
| 2016/0086285 A1* | 3/2016 | Jordan Peters | .. | G08G 1/096827 701/484 |
| 2016/0117776 A1* | 4/2016 | Maher | ............ | G06Q 50/16 705/4 |
| 2016/0171521 A1* | 6/2016 | Ramirez | ............ | B60K 35/00 701/409 |
| 2016/0189442 A1* | 6/2016 | Wright | ............ | H04M 1/72454 701/33.2 |

FOREIGN PATENT DOCUMENTS

| | | | | |
|---|---|---|---|---|
| AU | 2009201575 | | 11/2012 | |
| CA | 2713702 A1 | | 8/2009 | |
| CA | 2812395 A1 | | 2/2012 | |
| CN | 202348008 U | * | 7/2012 | |
| EP | 0368890 A1 | | 5/1990 | |
| EP | 1297470 A1 | | 4/2003 | |
| EP | 1762845 A2 | | 3/2007 | |
| EP | 2116968 A1 | | 11/2009 | |
| EP | 2435972 A1 | | 4/2012 | |
| JP | S61191944 U | * | 11/1986 | ......... G06Q 30/0185 |
| WO | 2002035494 A1 | | 5/2002 | |
| WO | 2004063855 A2 | | 7/2004 | |
| WO | 2009018650 A1 | | 2/2009 | |
| WO | 2009114199 A2 | | 9/2009 | |
| WO | WO-2009129496 A2 | * | 10/2009 | ........... G05D 1/0094 |
| WO | 2010062899 A1 | | 6/2010 | |
| WO | 2012063268 A2 | | 5/2012 | |
| WO | 2012135325 A2 | | 10/2012 | |
| WO | 2013043724 A1 | | 3/2013 | |

OTHER PUBLICATIONS

English translation of CN-202348008-U (Year: 2012).*
Kevin Lisota, "Review: At home with Wally, a new sensor network for detecting water leaks" Feb. 26, 2014, https://www.geekwire.com/2014/review-home-test-wally-water-leak-sensor-network/ (via the internet archives). (Year: 2014).*
"Extended Vehicle Protection from Assurant Solutions," USAA, dated Jun. 3, 2013. <https://www.usaa.com/inet/pages/extended_vehicle_protection_program_main_page?wa_ref=pubinsmain_EV_LM&aakredirect=true>.
"Hassle-Free Home Security," Scout, dated Jun. 3, 2013. <www.scoutalarm.com>.
"Home Security Systems," Reviews.com, Jun. 3, 2013. <www.reviews.com/home-security-systems/>.
"Professional Alarm Monitoring onl $8.95 A month," Smarthome, Jun. 3, 2013, <www.smarthome.com/alarm.html>.
"Common Questions About Home Insurance," Association of British Insurers, dated Apr. 2012.
"Preventing Costly Water Damage to Your Home and Belongings—Are Water Sensor Systems Right For You?," Allstate, dated Jun. 3, 2013. <www.allstate.com/tools-and-resources/be-aware-and-prepare/water-damage-prevetion.aspx>.
"Protecting Yourself and Your Home with Liberty Mutual," Liberty Mutual Insurance—Home Insurance Coverages, dated Jun. 3, 2013.
"Weather Station Installation Guide", Ambient Weather, downloaded from <www.ambientweather.com/eaofin.html> on Jun. 6, 2013.
"Green Roof Monitoring", HOBO Data Loggers—Onset, downloaded from <www.onsetcomp.com/green-roof-monitoring> on Jun. 6, 2013.
"Everything you should know about smart meters", CitiPower.
"Experts answer tornado questions", USA Today, downloaded from <www.usatoday.com> on Jun. 5, 2013.
"Guidelines for Smart Grid Cyber Security: vol. 2, Privacy and the Smart Grid", The Smart Grid Interoperability Panel-Cyber Security Working Group, Aug. 2010.
"Physical Security", FM 3-19.30, U.S. Department of the Army, Jan. 8, 2001.
"Now Smart Homes Get Smart Discounts", PRNewswire, Dec. 3, 2013.
Sep. 3, 2014—(US) Non-Final Office Action—U.S. Appl. No. 14/027,539.
Mar. 6, 2015—(US) Final Office Action—U.S. Appl. No. 14/027,539.
Sep. 9, 2015—(US) Non-Final Office Action—U.S. Appl. No. 14/027,539.
Mar. 16, 2016—(US) Final Office Action—U.S. Appl. No. 14/027,539.
Nov. 17, 2016—(US) Non-Final Office Action—U.S. Appl. No. 14/186,222.
Dec. 19, 2016—(US) Non-Final Office Action—U.S. Appl. No. 14/027,539.
Dennis E. Phillips et al., "Supero: A Sensor System for Unsupervised Residential Power Usage Monitoring", Mar. 2013, Department of Computer Science and Engineering, Michigan State University, Advanced Digital Sciences Center and Purdue University, entire document.
Saima Aman et al., "Energy Management Systems: State of the Art and Emerging Trends", Jan. 2013, University of Southern California, entire document.
Feb. 3, 2017—(US) Non-Final Office Action—U.S. Appl. No. 14/186,187.
Mar. 6, 2017—(US) Final Office Action—U.S. Appl. No. 14/186,222.
Apr. 27, 2017—(US) Final Office Action—U.S. Appl. No. 14/027,539.
Jun. 15, 2017—(US) Office Action—U.S. Appl. No. 14/186,187.
Aug. 17, 2017—(US) Non-Final Office Action—U.S. Appl. No. 14/186,222.
Oct. 17, 2017—(US) Office Action—U.S. Appl. No. 14/186,187.
Feb. 6, 2018—(US) Final Office Action—U.S. Appl. No. 14/186,222.
Feb. 8, 2018—(US) Final Office Action—U.S. Appl. No. 14/186,187.
Feb. 15, 2018—(US) Non-Final Office ActionvU.S. Appl. No. 14/027,539.
May 30, 2018—(US) Non-Final Office Action—U.S. Appl. No. 14/186,187.
May 30, 2018—(US) Non-Final Office Action—U.S. Appl. No. 14/186,222.
Sep. 4, 2018—(US) Final Office Action—U.S. Appl. No. 14/027,539.
Oct. 30, 2018—(US) Final Office Action—U.S. Appl. No. 14/186,187.
Oct. 30, 2018—(US) Final Office Action—U.S. Appl. No. 14/186,222.
Feb. 27, 2019—(US) Notice of Allowance—U.S. Appl. No. 14/186,187.
Cassie Peterson, "9 Ways to Make Money with smartHOME Technologies" SDM Magazine http://www.sdmmag.com/articles/89523-ways-to-make-money-with-smarthome-technologies Aug. 1, 2013, pp. 1-10.
Apr. 1, 2019—(US) Notice of Allowance—U.S. Appl. No. 14/186,187.
May 9, 2019—(US) Notice of Allowance—U.S. Appl. No. 14/186,222.
Jun. 27, 2019—(US) Non-Final Office Action—U.S. Appl. No. 14/027,539.
Mar. 3, 2020—(US) Final Office Action—U.S. Appl. No. 14/027,539.

(56) References Cited

OTHER PUBLICATIONS

Jun. 10, 2020—(US) Notice of Allowance—U.S. Appl. No. 16/458,463.
Lisota, Kevin, "Review: At home with Wally, a new sensor network for detecting water leaks" Feb. 26, 2014, https://www.geekwire.com/2014/review-home-test-wally-water-leak-sensor-network/ (via the internet archives. (Year: 2014).
Aug. 31, 2020—(US) Non-Final Office Action—U.S. Appl. No. 16/559,200.
Nov. 4, 2020—(US) Notice of Allowance—U.S. Appl. No. 14/027,539.
Feb. 17, 2021—(US) Notice of Allowance—U.S. Appl. No. 16/559,200.

\* cited by examiner

DEVICE SENSING

CROSS-REFERENCE TO RELATED APPLICATIONS

This application is a divisional of and claims priority to U.S. patent application Ser. No. 16/559,200, filed Sep. 3, 2019, and entitled "Device Sensing," which is a divisional of U.S. patent application Ser. No. 14/186,222, filed on Feb. 21, 2014, now U.S. Pat. No. 10,430,887, and entitled "Devise Sensing," the contents of which are incorporated herein by reference in their entirety.

TECHNICAL FIELD

Aspects of the disclosure generally relate to monitoring and/or sensing of one or more home devices, one or more vehicles or aspects of a vehicle, and/or one or more health or life characteristics. For instance, various aspects described herein relate to receiving data from one or more sensors associated with one or more home devices, one or more sensors associated with one or more vehicles and/or data received related to health or life aspects of a user (e.g., healthy living habits, and the like). The data may be used to identify and/or adjust insurance rates or premiums, provide discounts or rebates, identify incentives for a user, and the like.

BACKGROUND

People are often looking for ways to protect their assets, such as a home, vehicle, etc. People buy insurance for exactly that reason—to protect against unforeseen risks. However, assessing risk in order to determine insurance premiums or rates can be complicated and often relies on generic information, rather than information specific to the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices of a user, such as appliances, home systems, etc. and/or one or more sensors associated with a vehicle of the user, and/or receiving data associated with a lifestyle of the user. The data may aggregated and analyzed to assess risk associated with the user in order to determine or adjust an insurance rate or premium.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
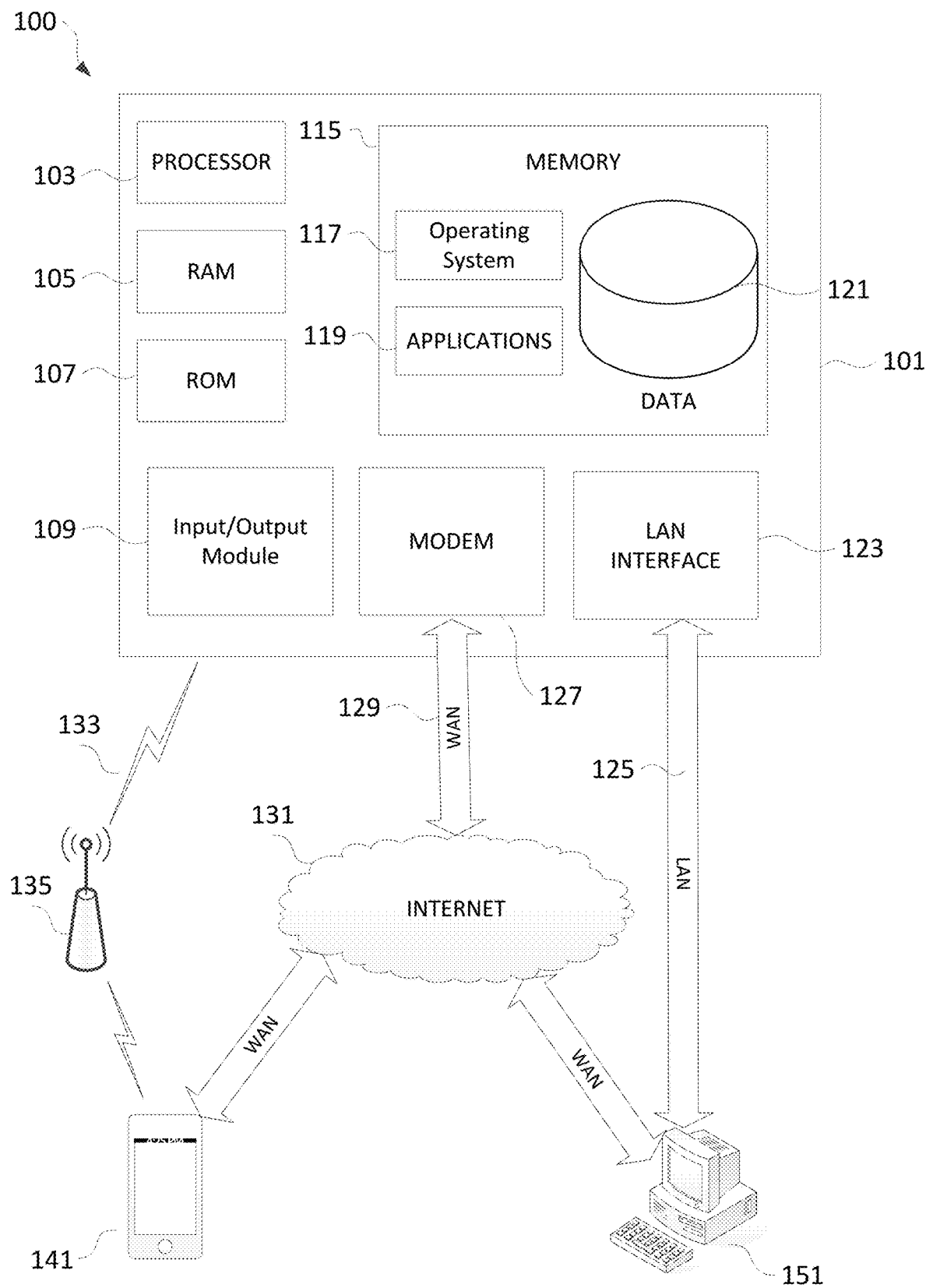
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple sensing or monitoring systems or devices, such as various servers or systems, such as a system or systems for sensing and/or monitoring aspects of one or more home devices, system or systems for sensing and/or monitoring aspects of a vehicle or driving habits, and the like. Such systems may be configured as described herein for receiving data associated with one or more home devices, one or more vehicles, one or more health or lifestyle aspects, etc., to determine whether the operation of these devices is within an acceptable range, identify any potential issues or failures, identify or adjust insurance rates based on the received data, provide insurance incentives for improvement based on the data, etc.

Input/output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a home device, vehicle, lifestyle aspect, etc., determine one or more aspects of operation of the device and/or one or more overall aspects of a customer's lifestyle and/or provide insurance rates and/or incentives based on the data.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the sensing or monitoring system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the sensing system 101 may include computer-executable instructions (e.g., home device characteristic data analysis, etc.) for receiving data associated with a home device of a user, analyzing the data to determine one or more aspects of the home device, and/or generating insurance rates, adjustments, incentives, etc. based on the data. Additionally or alternatively, one or more application programs 119 used by the sensing system 101 may include computer-executable instructions (e.g. home device, vehicle and/or lifestyle data analysis, etc.) for receiving data associated with one or more aspects of a home device of a user, one or more aspects of a vehicle and/or driving characteristics of the user, and/or one or more aspects of the lifestyle of the user. The data may, in some examples, be used to identify insurance rates, adjustments, incentives, and the like.

The systems described herein may be used by an insurance company, financial institution or other entity to monitor one or more home devices, vehicles, driving characteristics, lifestyle characteristics, etc. of a user. Although many examples herein will be described as being used in conjunction with an insurance company, the systems and methods described herein may be used by or with other entities or types of entities without departing from the invention.

Figure 2A:
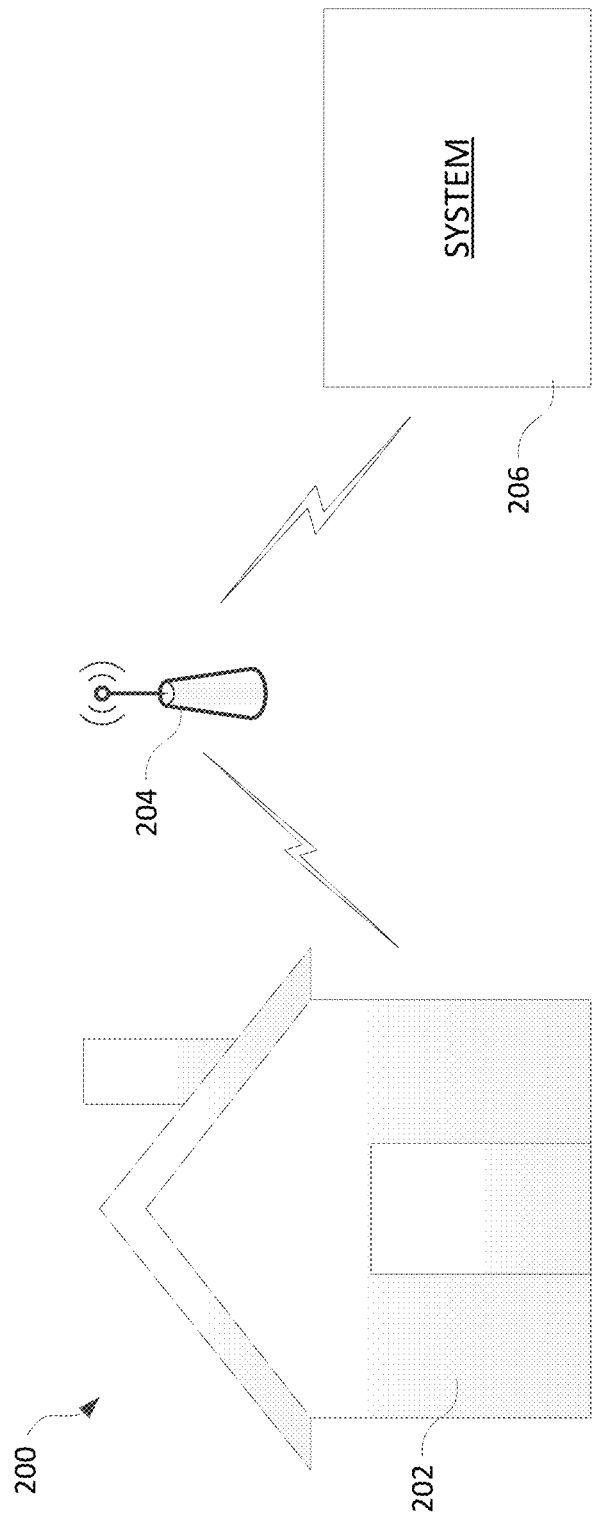
FIG. 2A is a schematic diagram of an example sensing system according to one or more aspects described herein.
Figure 2B:
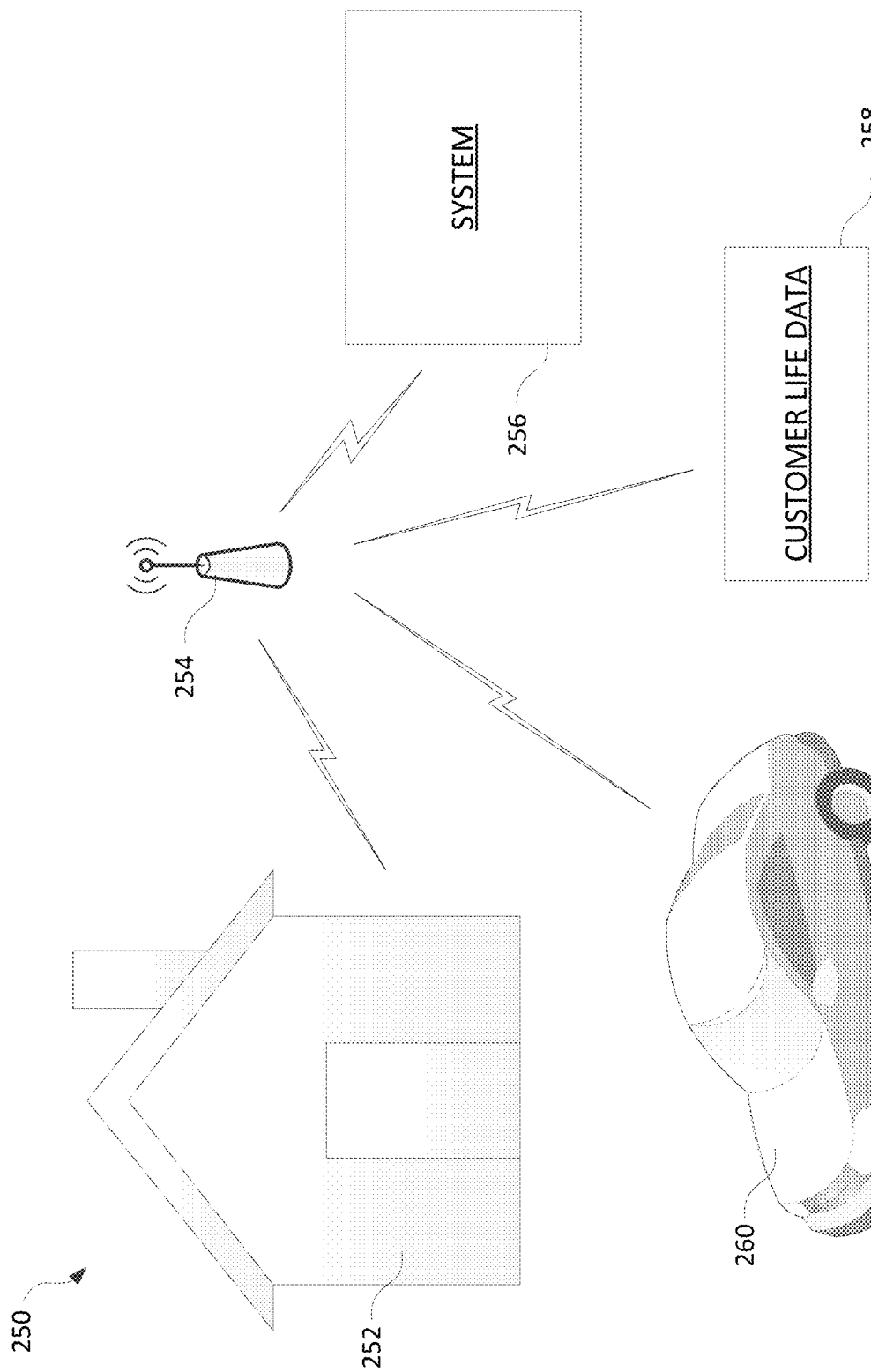
FIG. 2B is a schematic diagram of another example sensing system according to one or more aspects described herein.

In some arrangements, a sensing or monitoring system may be implemented by an entity. In some examples, the entity may be an insurance company. FIGS. 2A and 2B are schematic illustrations of sensing and/or monitoring system arrangements according to one or more aspects described herein. As shown in FIG. 2A, the arrangement 200 may include a home 202. The home 202 may generally include a variety of systems, appliances, etc. that may be monitored by the sensing system described herein. For instance, one or more sensors or sensing devices may be arranged on or integrated into devices such as hot water heaters, refrigerators, washing machines, dryers, furnaces, air conditioning units, and the like. Sensors or sensing devices may also be used to monitor home infrastructure, such as doors, windows, foundation, etc., air quality, and the like. In some examples, sensors or other monitoring devices may be arranged on or integrated into paint, bricks or other building materials, and the like. Other home devices may include sensors or may be monitored without departing from the invention.

In some examples, various types of sensors may be used with the sensing and/or monitoring system. For instance, power sensors, water sensors, heat or smoke sensing devices, moisture sensors, motion sensors, open/close sensors, presence sensors, cameras, and the like, may be used. In still other examples, "smart" materials may be used, such as smart paints, smart bricks, and the like, that may provide indications of wear or potential failure. In still other examples, sensors may be used to monitor utilities (e.g., water, gas, electric).

The home 202 depicted in FIG. 2A may include a plurality of appliances and/or systems, and one or more of the appliances and/or systems (e.g., devices) may be monitored by one or more sensing devices, as will be described more fully below. Signals from the one or more sensing devices may be transmitted to the sensing system 206 at an entity, such as an insurance company. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

FIG. 2B illustrates another example sensing arrangement 250. Similar to the arrangement of FIG. 2A, the arrangement 250 of FIG. 2B includes a home 252 that may include a plurality of appliances and/or systems that may be monitored by one or more sensing devices. In addition, the arrangement 252 may include one or more vehicles, such as vehicle 260. The vehicle 260 may include one or more sensing devices configured to monitor driving habits of a user. The data associated with the vehicle 260 may be transmitted to a sensing system 256, e.g., via wired or wireless communications.

For instance, a vehicle, such as an automobile, motorcycle, boat, or other vehicle, may include vehicle operation sensors capable of detecting and recording various conditions at the vehicle and operational parameters of the vehicle. For example, sensors may detect and store data corresponding to the vehicle's speed, distances driven, rates of acceleration or braking, and specific instances of sudden acceleration, braking, and swerving. Sensors also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors may detect and store the external driving conditions, for example, external temperature, rain, snow, light levels, and sun position for driver visibility. Sensors also may detect and store data relating to moving violations and the observance of traffic signals and signs by the vehicle. Additional sensors may detect and store data relating to the maintenance of the vehicle, such as the engine status, oil level, engine coolant temperature, odometer reading, the level of fuel in the fuel tank, engine revolutions per minute (RPMs), and/or tire pressure.

The vehicle also may include one or more cameras and proximity sensors capable of recording additional conditions inside or outside of the vehicle. Internal cameras may detect conditions such as the number of the passengers in the vehicle, and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving event data analysis.

The operational sensors and the cameras and proximity sensors may store data within the vehicle, and/or may transmit the data to one or more external computer systems (e.g., a sensing system 300 in FIG. 3), as will be discussed more fully below.

In some examples, the arrangement 250 may further include customer health or lifestyle data 258. Customer health/lifestyle data 258 may include a database storing various information related to a customer's lifestyle, eating habits, exercise habits, general health, and the like. The customer health/lifestyle data 258 may be provided by the user and/or may be collected from one or more outside sources (e.g., social media, health club records, etc.). In some examples, a user may track eating habits, exercise habits, and the like via an application, such as an application on a mobile device, and that information may then be transmitted to the sensing system 256.

The data transmitted to the sensing system 256 may be aggregated and some or all of the portions of the data may be used to identify and/or adjust insurance premiums or rates, provide insurance incentives, and/or provide discounts to the user. For instance, a user may be eligible for a discounted insurance premium if the user is willing to share the monitored or collected data with an entity, such as an insurance company. This data may then be used to modify or set insurance premiums or rates for the user (e.g., home insurance, vehicle insurance, life insurance, health insurance, and the like) and/or to more accurately assess risk associated with a user. Additionally or alternatively, the data collected may be aggregated with other data (e.g., historical data collected over many years, other user monitored data, etc.) to further assess risk and/or set premiums or rates. The aggregated data may, in some examples, be sorted by locality (e.g., neighborhood, township, state, etc.) to assess risk by geographic location and set or adjust premiums or rates based on geographic location, as desired.

The arrangements 200, 250 described in FIGS. 2A and 2B are merely schematic examples of some arrangement systems. The data transmissions may be made from various types of sensors monitoring one or more types of devices or systems without departing from the invention. Further, any data transmission may be made via wired or wireless connection and/or may be made to a base collection unit 204, 254 or directly to a system 206, 256, such as a sensing system used by an entity (e.g., an insurance provider). The collected data may be used or aggregated (e.g., with other data from a same or similar device and/or with data from other devices) to determine or adjust an insurance premium or rate, identify one or more characteristics or features of the devices being monitored (e.g., age, condition, etc.), provide incentives or discounts to users, and the like. Various uses of the collected data will be discussed more fully below.

Figure 3:
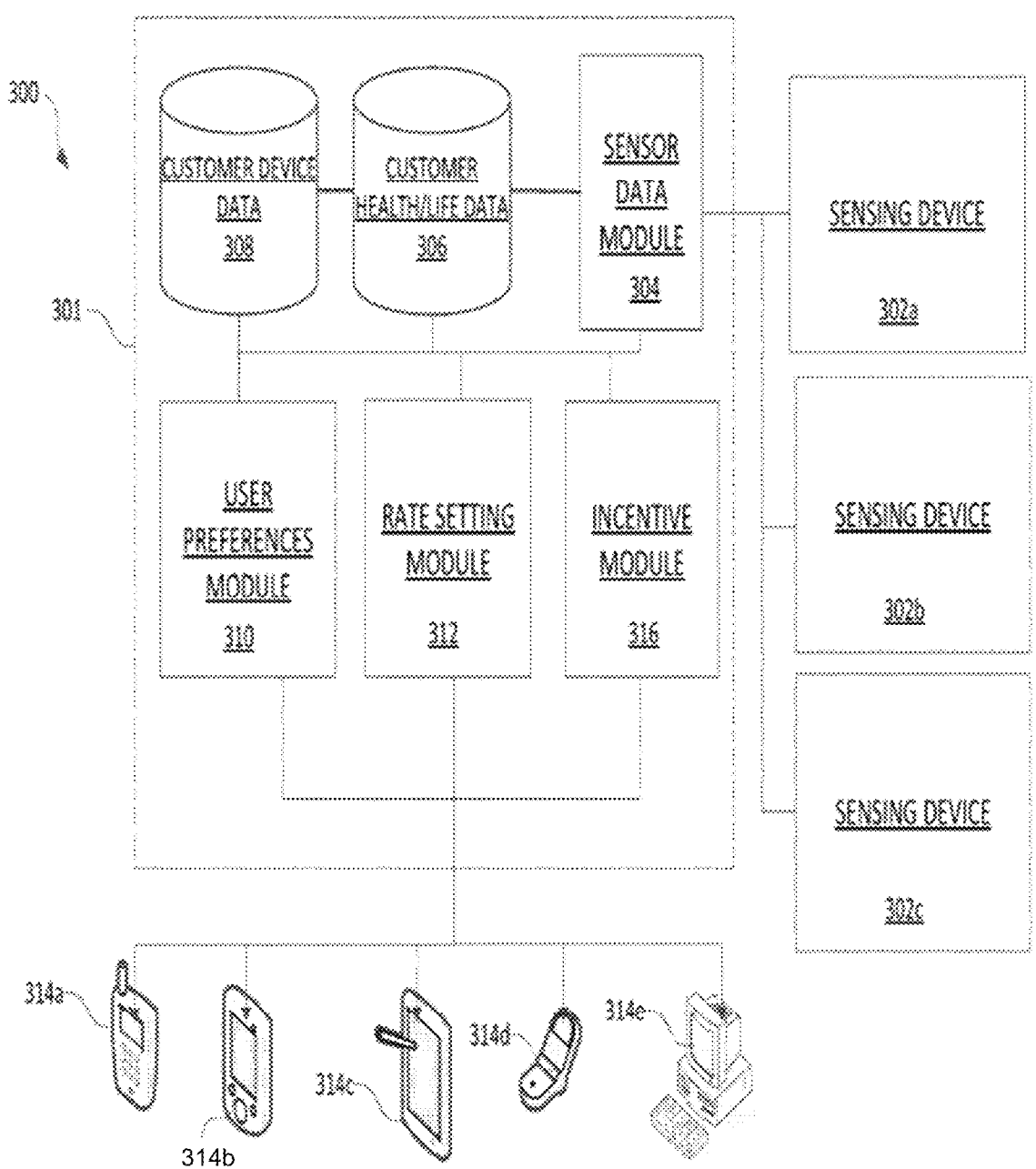
FIG. 3 is an example sensing system according to one or more aspects described herein.

FIG. 3 illustrates one example sensing system 300. Each component shown in FIG. 3 may be implemented in hardware, software or a combination of the two. Additionally, each component of the sensing system may include a computing device (or system) having some or all of the structural components described above for computing device 101. In some arrangements, some or all of the components of system 300 may be housed in a single physical device. Alternatively, some or all of the components may be housed in separate physical devices.

The sensing system 300 may be associated with an entity 301. For instance, the system 300 may be implemented by an entity 301, such as an insurance company. In other examples, the system 300 may be implemented by various other types of companies, universities, government entities, and the like. Several examples discussed herein will be described in the context of an insurance company. However, nothing in the disclosure should be viewed as limiting the systems, methods, computer-readable media, and the like, described herein to use with insurance companies.

The sensing system 300 may include a plurality of sensing devices 302a-302c. The sensing devices 302a-302c may be a variety of types of devices and may be used to monitor or sense one or more characteristics of a home device, such as an appliance, system, etc., vehicle, and the like. For instance, the sensing devices 302a-302c may include power sensors, float switches, moisture sensors, power sensors or monitors, wear indicating devices, speed sensors, and the like. In other examples, the sensing devices 302a-302c may include devices for sensing temperature, sewage backup, natural gas, propane, etc., air quality (e.g., carbon monoxide, etc.), air flow quality, water flow, motion, mold, smoke, electrical shorts, and the like. Various other types of sensing devices and/or characteristics may be monitored via sensing devices 302a-302c.

In some arrangements, one or more of sensing devices 302a-302c may be integrated into, connected with or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, and the like, may be monitored. Various other appliances and/or systems may be monitored without departing from the invention.

In some examples, one or more of sensing devices 302a-302c may be connected to or in communication with systems of a vehicle. For instance, one or more of the sensing devices 302a-302c may be configured to monitor driving habits of a user, such as driving speed, acceleration, braking, and the like. Data may be transmitted from the sensors connected to the vehicle to the sensing system (e.g., system 206 or 256) to be used to determine and/or adjust insurance rates or premiums, assess risk, and the like. In some examples, the vehicle data may be aggregated with home sensing data received from one or more of sensing devices 302a-302c to further assess risk, set rates, etc.

Although the sensing system 300 includes three sensing devices 302a-302c, the system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption) or vehicle. Additionally or alternatively, each sensing device 302a-302c may be connected to or in communication with a different home device or vehicle, or multiple sensing devices 302a-302b may be connected to or in communication with a single home device or vehicle such that multiple, different characteristics of the home device or vehicle are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by the sensing system 300. For instance, signals and/or data may be transmitted from the sensing devices 302a-302c to the system 300 via wired or wireless transmission. In some examples, the data and/or signals may be transmitted to a base unit for collection prior to transmission to the system 300 or entity 301 associated with the system. In other examples, the data and/or signals may be transmitted directly from each sensor 302 to the system 300 or entity 301.

The signals and/or data from the sensing devices 302a-302c may be received by a sensor data module 304. The sensor data module 304 may include one or more computing devices containing many or all of the hardware and/or software components of the computing device 101 in FIG. 1. The sensor data module 304 may include hardware, software and/or network components configured to receive and/or transmit information to and/or from various computing devices, modules, databases, sensors, and the like.

The sensor data module 304 may be configured to perform a set of functions within the sensing system 300. For instance, the sensor data module 304 may collect data and/or signals received from one or more sensing devices 302a-302c and may include one or more algorithms which may be executed by one or more software applications running on generic or specialized hardware within the sensing system 300 to determine whether data is within a predefined range. For instance, the sensor data module 304 may identify signals or data that are outside a predefined range (e.g., a normal or typical operating range) and, responsive to determining that the data is outside the predefined range, transmit an alert to a user identifying the potential issue. In some examples, the predefined range may be set, such as by a system administrator. In other examples, the predefined range may be based on historical data of the user or similar devices being monitored. In some examples, the historical data may be stored in a database, such as customer device database 308, as will be discussed more fully below.

In some arrangements, the sensor data module 304 may aggregate data received from sensing devices 302a-302c for later use, as will be discussed more fully below.

Data received from sensors 302a-302c may be stored in customer device database 308. The customer device database may be organized in any of several different manners. For example, a table in the customer device database 308 may include a listing of various users, home devices associated with each user, historical data of the home devices, current or recent weather data, historical weather data, vehicle and/or driving data of the users, geographic location of users, and the like.

In some examples, customer device database 308 may also include historical data collected from users without the use of sensors. For example, the customer device database 308 may include information provided by users, such as information associated with appliances, vehicles, home systems, etc. For instance, upon purchase of an appliance (e.g., stove, refrigerator, water heater, etc.) a user may provide information regarding the manufacturer, model, serial number, year of purchase or manufacture, amount paid, etc. for the appliance. Accordingly, as users add information for each appliance, system or vehicle, a catalog of device information may be maintained by the customer device database 308. This catalog of information may be used to track the age of appliances, systems, vehicles, etc., determine or assess risk associated with those appliances, systems or vehicles, identify opportunities for improvement (e.g., energy efficiency improvements), and the like.

In some examples, a radio frequency identifier (RFID), quick response (QR) code, bar code, or other data element may be applied to the appliance, system or vehicle to simplify tracking and/or identification of the appliance. For instance, if a repair is made to an appliance, the repair information may be provided to the system and may be input to the system by scanning the QR code, bar code, etc. and updating the information associated with that appliance, system or vehicle. The information may also be used to determine or aid in determining household inventory in cases of flood, fire, or other catastrophe.

The information stored in the customer device database 308 may also be used to alert users of recalls associated with one or more appliances, systems or vehicles within the system. For instance, recall information may be transmitted to the system 300 from one or more external systems (e.g., device or manufacturer systems), and the system 300 may identify any devices matching the recall information and may transmit an alert to the user(s) associated with that device.

In still other examples, customer device database 308 may include historical customer information gathered from clients without the use of sensors. For instance, historical data from customers regarding incidents or damage to the home, appliances, system, vehicle, etc. may be obtained, such as from previous insurance claim information, and stored to further aid in assessing risk and setting or adjusting insurance rates or premiums.

The sensing system 300 may further include customer health/life data 306. Customer health/life data may be received from the customer or user and may include information regarding the general health and/or lifestyle of the user. For instance, it may include eating habits of the user (e.g., healthy or unhealthy eating habits), exercise habits of the user, general wellness information (e.g., whether the user visits the doctor on at least an annual basis, etc.). The information may be received by the system via one or more computing devices, such as computing devices 314*a*-314*e*. For instance, a user may input health and/or life data via a smart phone 314*a*, personal digital assistant (PDA) 314*b*, tablet computer 314*c*, cell phone 314*d* or computer terminal 314*e*. Various other types of computing devices may be used without departing from the invention. In some examples, data may be stored in a mobile device application and transmitted from the application to the system 300. In still other examples, some data, such as exercise data, may be collected via one or more sensors (e.g., accelerometers, pedometers, heart rate monitors, etc.) that are connected to the system. For instance, a user may have a device that monitors pace, speed, heart rate, and the like. This information may be uploaded from the user device to the system for use in determining and/or adjusting insurance rates or premiums, assessing risk associated with the user, and the like.

The sensing system 300 may further include a user preferences module 310. The user preferences module 310 may be implemented in hardware and/or software configured to perform a set of functions within the sensing system 300. For instance, the user preferences module 310 may receive and/or store one or more customer or user preferences associated with the sensing devices 302*a*-302*c* and/or the system in general. For example, a user may monitor one or more systems, appliances, vehicles, etc. However, the user may desire to only transmit a portion of the collected data to the system. Accordingly, a user may set up a user preference identifying the devices, appliances, systems and/or vehicles for which the system may monitor and/or receive data. Thus, a user may desire to only provide data associated with one or more home systems and not provide data associated with life or vehicle. In another example, a user may desire to provide all of the home device data, vehicle data, health/lifestyle data. Various other examples and combinations may be used without departing from the invention. In some examples, the entity may provide additional incentives, discounts, etc. based on the number of devices and/or data sets being received by the entity. For instance, if a user's preferences indicate that all device data may be transmitted to the entity, that user may receive more incentives and/or discounts than a user providing only a portion of the collected data.

The sensing system 300 may further include a rate setting module 312. The rate setting module 312 may be implemented in hardware and/or software configured to perform a set of functions within the sensing system 300. For instance, the rate setting module 312 may determine and/or adjust insurance rates or premiums based on the data collected by or stored within the system 300. The rate setting module 312 may analyze the data to assess risk associated with one or more users, devices, geographic areas, etc. and may use that information to provide insurance adjustments or determine rates or premiums for users that may include customers or potential customers of the entity (e.g., the insurance company). In some examples, the rate setting module 312 may be in communication with or connected to other systems associated with the entity to aid in assessing risk, determining rates, etc.

The sensing system 300 may further include an incentive module 316. The incentive module may be implemented in hardware and/or software configured to perform a set of functions within the sensing system 300. For instance, the incentive module 316 may identify one or more rebates, discounts, incentives, etc. to provide to a user based on the data collected by or stored within the system 300. For instance, if the collected data indicates that a water heater is likely to fail (e.g., based on an age of the water heater, detected corrosion within the water heater, etc.) the system may generate an incentive for the user to replace the water heater. For instance, the system may identify a 5% discount on homeowners insurance for the user if the water heater is replaced within a predetermined period of time.

In another example, sensor data may indicate that a rupture of a water line connected to a refrigerator is likely. Accordingly, the system may identify an incentive for the user to repair/replace the water line, replace the refrigerator, etc.

In yet another example, an incentive may be generated for the user based on a modification of driving habits, lifestyle habits, etc. For instance, if the sensor data received from a vehicle associated with the user indicates unsafe driving habits (e.g., not wearing a seat belt, speeding, use of a phone while driving, etc.) an incentive may be generated and offered to the user to receive a discount, rebate, rate adjustment, etc. based on changes to those driving habits. Additionally or alternatively, a user with health/lifestyle data indicating a relatively unhealthy lifestyle (e.g., little or no exercise, poor eating habits, etc.) may receive an incentive to improve those lifestyle habits.

The above examples of incentives are merely some example incentives that may be generated and/or provided by the system. Various other examples, of incentives may be used without departing from the invention.

Figure 4:
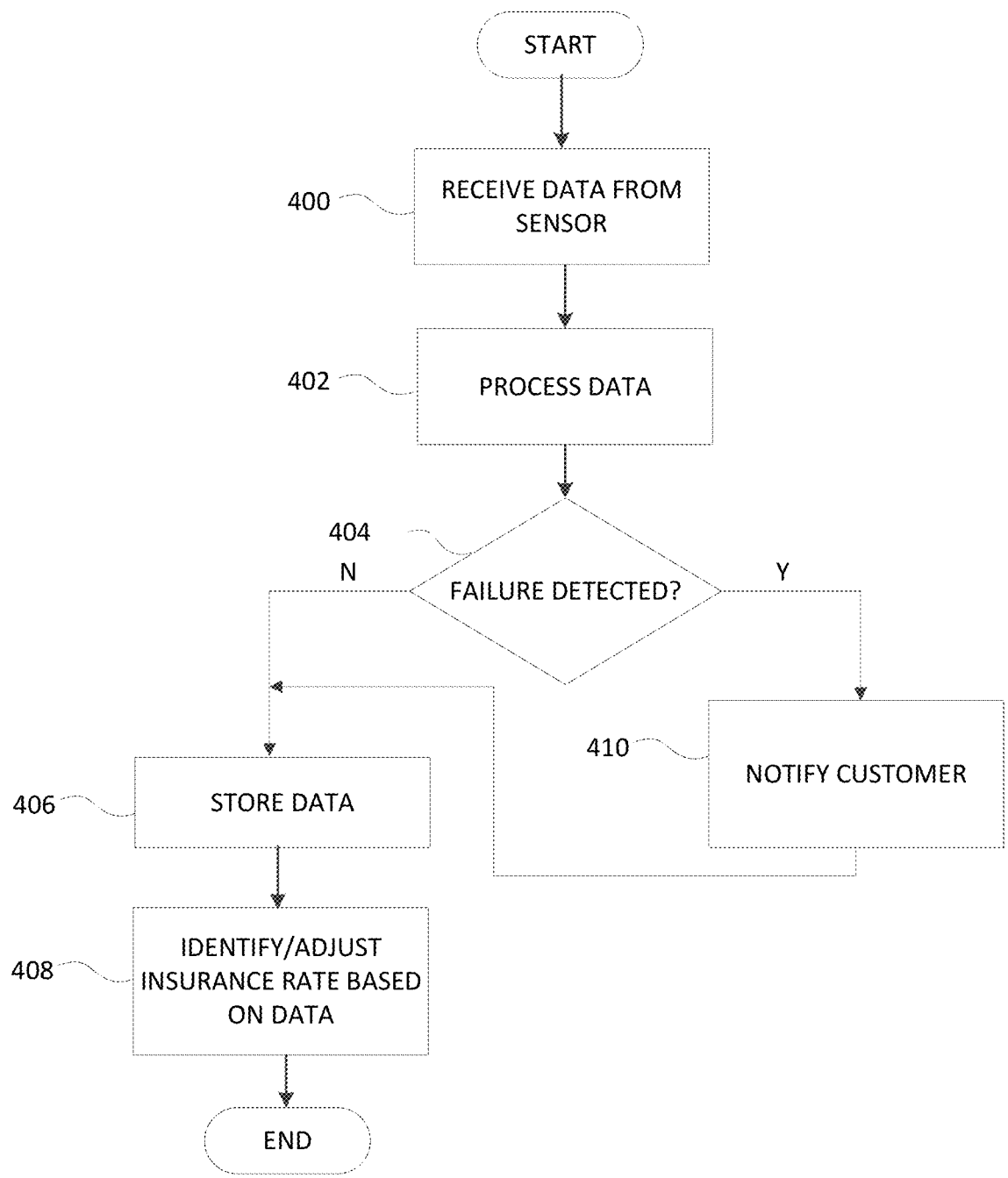
FIG. 4 is a flow chart illustrating one example method of implementing a sensing system according to one or more aspects described herein.

FIG. 4 illustrates one example method of implementing a sensing system according to one or more aspects described herein. In step 400, data is received from a sensor. In some examples, data may be received from a plurality of sensors. The plurality of sensors may be associated with one home device or with a plurality of home devices. In step 402, the data is processed to determine whether the received data is outside of a predefined threshold. For instance, a determination may be made as to whether the received data indicates that the device is operating outside of a typical range of data.

In step 404, a determination is made as to whether a failure is detected. Detection of a failure may include a decrease in performance (e.g., sensor data indicates device is operating outside of the predefined or normal range), failure of a portion of a device (e.g., water line on refrigerator but not failure of entire refrigerator), or failure of an entire device (e.g., temperature or moisture sensor indicates water heater has failed). If a failure is detected (e.g., based on the received/processed sensor data) in step 404, the customer or user associated with the device may be notified in step 410. For instance, a notification may be sent via email, phone, SMS, and the like. The notification may be sent to a computing device of the user, such as a mobile device or user interface arranged in a vehicle.

If, in step 404, a determination is made that the data does not indicate a failure, or after the notification has been sent to the user, the data received from the sensor may be stored in step 406. For example, the data may be stored in a database, such as customer device database 308 in FIG. 3. In step 408, the received data (and, in some instances, other data) may be used to set or adjust one or more insurance rates or premiums. For instance, the received data may be used to more accurately assess risk associated with a home device or household in general, and may be used to adjust or determine an insurance rate or premium based on this assessed risk. As discussed above, the more devices being monitored by the sensing system, the more accurately the risk may be assessed and thus the insurance rate or premium may be adjusted accordingly.

Further, as information from one or more devices or monitors is collected, the data may be aggregated to determine risk. The aggregate data may indicate that risks are reduced by having certain types of sensors or monitoring devices in the home. Accordingly, discounts, rebates, rate reductions, etc. may be offered to homeowners using the devices to continue use of the devices. Also, discounts, rebates, rate reductions, etc. may be offered to other homeowners or customers who currently are not using the devices, as an incentive to install the devices/monitoring system.

Figure 5:
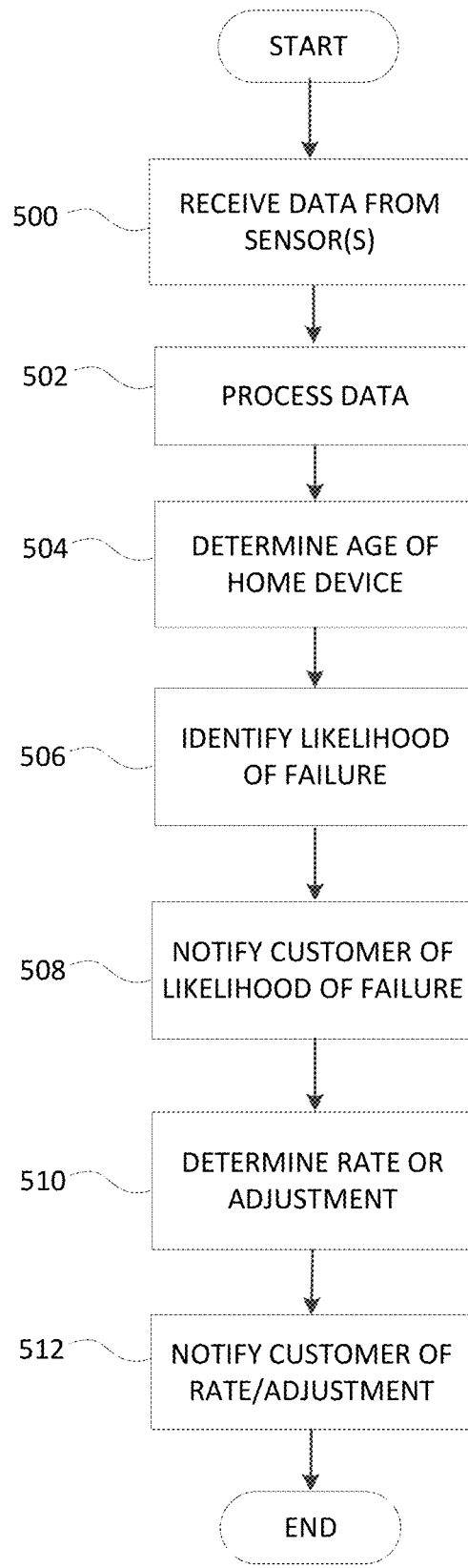
FIG. 5 is a flow chart illustrating another example method of implementing a sensing system according to one or more aspects described herein.

FIG. 5 illustrates another example implementation of a sensing system according to one or more aspects described herein. In step 500, data may be received from one or more sensors. For instance, data may be received from a plurality of sensors associated with one home device or from sensors associated with a plurality of home devices. In step 502, the received data may be processed to extract information that may be used in additional analysis and/or determinations. For instance, the data may be processed to determine an age of the home device in step 504. For example, one or more levels of wear may be detected by the sensors and may be transmitted to the system. The system may then determine an approximate age of the home device. In some examples, the age may be indicative of the actual years the home device has been in use. Additionally or alternatively, the determined age may be an approximate number of years based on operational data received from sensors (e.g., estimated age based on the performance of the device which may or may not be the same as the actual age of the device).

In some examples, as discussed above, a system may maintain information associated with the manufacturer, model, serial number, etc. of various home devices. In some arrangements, the system may use this information, in conjunction with received sensor data, to determine an age of the home device.

In step 506, the data and the determined age of the device may be used to determine a likelihood of failure of the device or one or more portions of the device. For instance, the determined age may be compared with known failure rates (e.g., based on publicly available data, data collected by the entity from other failures or insurance claims filed, and the like) to determine a likelihood of failure.

In some examples, the likelihood of failure may also be based on the type (e.g., make and/or model) of the device. For instance, if a user has provided information to the entity or insurance company regarding the make, model, etc. of the device (e.g., for cataloging or tracking purposes as discussed above), that information may be used to identify known failures or deficiencies in that particular product, which may aid in more accurately determining the likelihood of failure.

The determined likelihood of failure may then be transmitted to a user or customer associated with the device in step 508. For instance, an email, SMS message, etc. may be transmitted to the user indicating that the received data indicates a potential failure. In some examples, the user may be prompted to take additional action (e.g., work with the insurance company or entity to repair or replace the device).

In step 510, an insurance rate for the user or customer associated with the device, or an adjusted rate, based on the received data, determined age of the device and determined likelihood of failure may be determined. For instance, if the received data indicates that a device is relatively new, is operating within normal parameters, etc. the determined likelihood of failure is likely to be low and the user may get a reduced insurance premium or may receive a discount or rebate. Alternatively, if the data indicates that the device is relatively old and is likely to fail (e.g., in the next 6 months, 12 months, 18 months, etc.) then the rate for the user may increase due to the increased potential risk of failure of the device that may lead to an insurance claim.

In some arrangements, the users may be notified of the potential rate or adjustment prior to the rate or adjustment taking effect, as indicated in step 512. The user may then have an opportunity to take action in order to further adjust the rate. For instance, the user may replace the device likely to fail in order to avoid an increase in insurance premium. In some examples, the user may be provided with a time limit in which to take action prior to the rate or adjustment going into effect. For instance, the user may be notified that if the device is not repaired or replaced within, for example, 30 days, 60 days, etc., the new or adjusted rate will go into effect. In some arrangements, upon replacement of the device, the entity may hold the adjustment of the rate until sufficient data is collected to determine that the device has been replaced and is functioning within an acceptable range. This may provide additional security to the insurance company to avoid fraudulent indications of replacement of devices.

Figure 6:
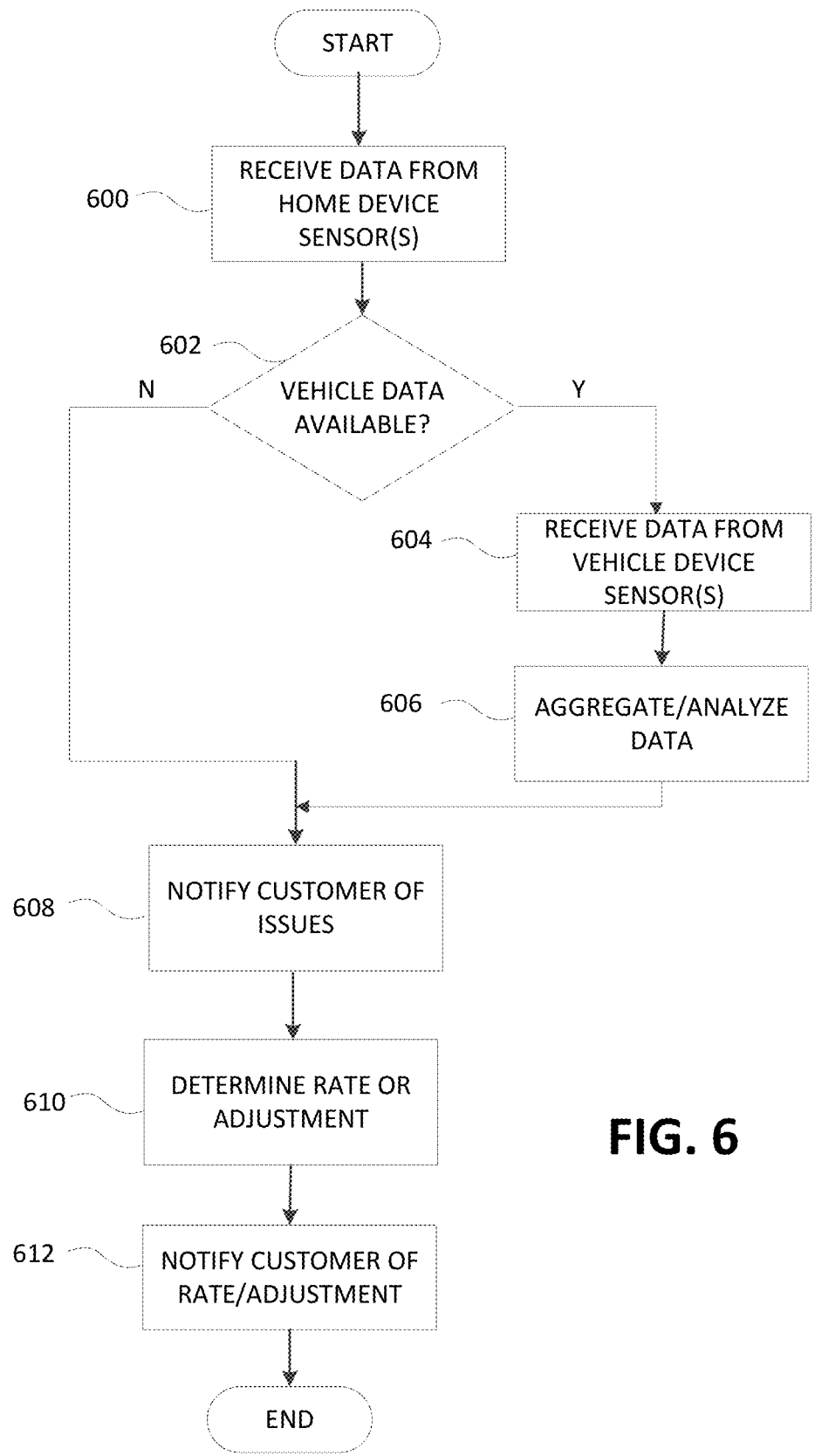
FIG. 6 is a flow chart illustrating yet another example method of implementing a sensing system according to one or more aspects described herein.

FIG. 6 illustrates another example implementation of a sensing system according to one or more aspects described herein. In step 600, data is received from one or more sensing devices associated with a home device. The data may be received from multiple sensors and/or multiple devices. In step 602, a determination is made as to whether vehicle data associated with the user is available. For instance, the determination may include whether the user is monitoring vehicle data, whether the user's preferences allow access to the vehicle data, and the like. If, in step 602, vehicle data is not available, any issues identified in the home data may be transmitted to the user in step 608. For instance, a notification may be sent to a user that one or more home devices are operating outside of a predefined or normal threshold.

In step 610, the received home device data may be used to determine an insurance rate or premium, or adjustment to a rate, for the user. For instance, the insurance company or entity may use the data to assess risk associated with the home device(s), home in general, etc., to determine an appropriate insurance rate for the user. In step 612, the insurance rate or adjustment may be communicated to the user. In some examples, notifying the user of the new rate or adjustment may include an option to obtain a discount if action is taken regarding home devices detected as being old, not operating properly, etc. In some examples, if the new rate or adjustment would result in an increase in costs for the user, the user may be given an option to repair or replace one or more home devices before the rate or adjustment takes effect. If the repair or replacement is completed, the user might not be subject to the rate increase.

If, in step 602, vehicle data is available and accessible by the system (e.g., based on user preferences), then the vehicle data may be received from one or more sensors associated with a vehicle in step 604. In step 606, the data from the home device(s) and vehicle(s) may be aggregated and analyzed to more accurately assess or determine risk, set rates, etc. The process may then continue at step 608 in which the system may notify a user of any detected issues with one or more home devices or with the vehicle associated with the vehicle data. In step 610, the rate or adjustment may be do homeowners insurance, renters insurance, etc. based on the home device data and/or to automotive insurance based on the vehicle data received. In step 612, the customer may be notified of any potential adjustments to the rate.

Figure 7:
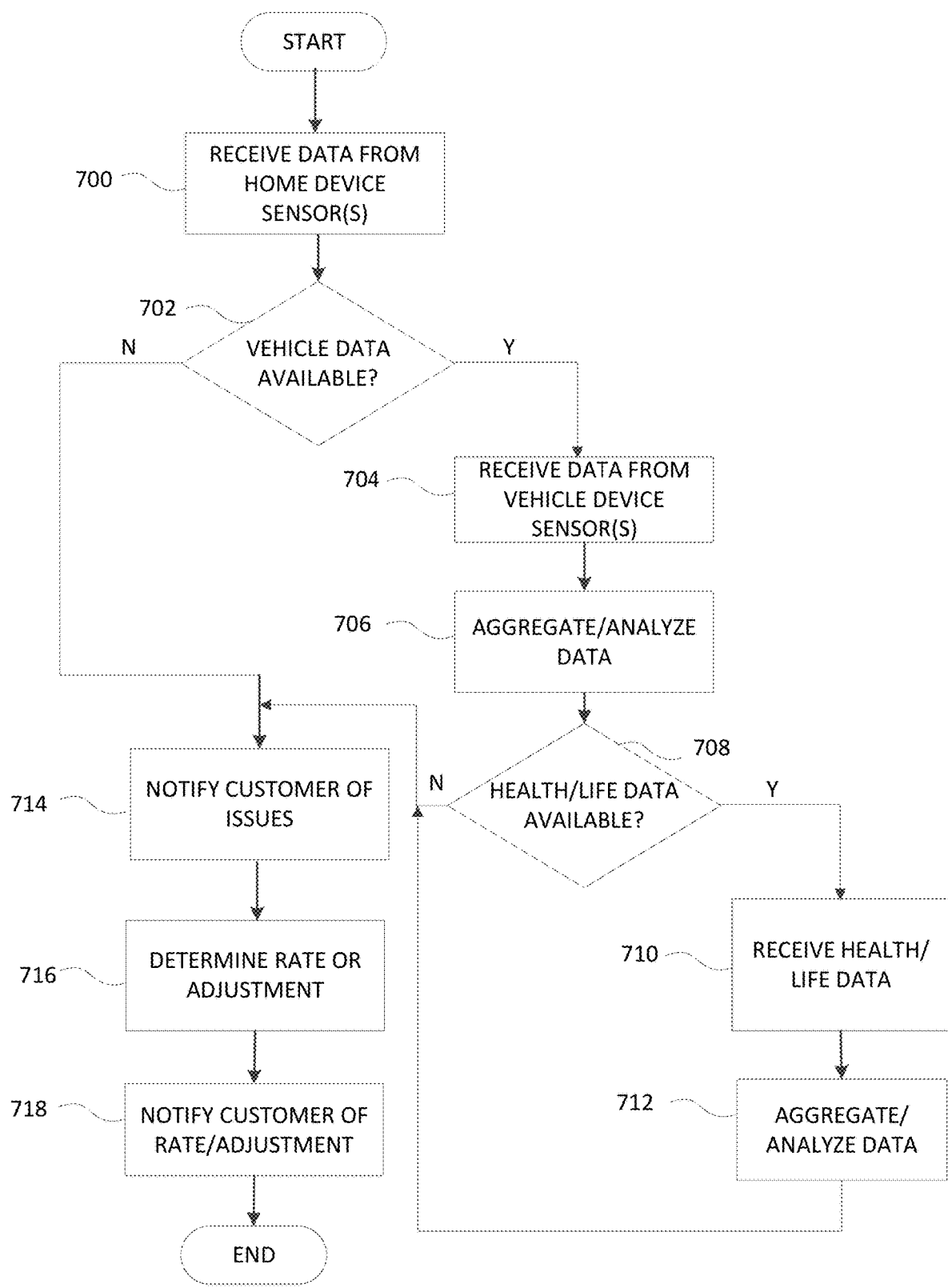
FIG. 7 is a flow chart illustrating still another example method of implementing a sensing system according to one or more aspects described herein.

FIG. 7 illustrates yet another example method of implementing a sensing system according to one or more aspects described herein. Similar to the method illustrated in FIG. 6, in step 700, device data may be received from one or more home devices. In step 702, a determination may be made as to whether vehicle data is accessible by the system. If vehicle data is not available or accessible, the system may notify the customer of any issues detected from the data associated with the home devices in step 714. In step 716, an insurance rate or adjustment may be determined based on the home device data. In step 718, the rate or adjustment may be transmitted to the user.

If, in step 702, vehicle data is available and accessible (e.g., as identified in a user's preferences) vehicle sensor data may be received in step 704. In step 706, the data may be aggregated and/or analyzed with the home device data to determine or assess risk, set rates, etc. For instance, a risk score may be calculated based on home device data (e.g., home maintenance information, lack of maintenance, etc.) and vehicle data (e.g., fast turns, quick stops, quick acceleration, and the like). The risk score may be calculated using a variety of methods and may indicate a risk associated with the user based on the data collected from the home devices and vehicle. This risk score may then be used to predict home losses and/or auto losses. For instance, in situations where individual behaviors may contribute to potential home or auto losses (e.g., theft, liability, etc.), the risk score may aid in determining a likelihood of loss or damage.

In step 708, a determination may be made as to whether health and/or life data associated with the user is available to and accessible by the system. If health/life data is not available or accessible, the process moves to step 714 in which any issues associated with any home device and/or vehicle data may be transmitted to the user. In step 716, an insurance rate or adjustment for a user's home or vehicle may be determined, and in step 718, the rate or adjustment may be transmitted to the user.

If, in step 708, health/life data is available and accessible by the system, the health/life data may be received by the system in step 710. The health/life data may include eating habits, exercise habits, general wellness information, and the like. In some examples, health/life information may include whether the user regularly visits a doctor, whether the user has an annual blood screening, and the like. The health/life data may be voluntarily provided by the user, e.g., via user input received from a computing device in communication with or connected to the system. In some examples, some or all of the health/life data may be collected from user devices monitoring eating habits, exercise habits, and the like. For instance, the user may use a mobile device application that tracks a user's daily calorie intake, steps walked/run, exercise minutes, heart rate, pace, and the like. The data may be collected via one or more sensors (e.g., heart rate sensors, accelerometers, pedometers, etc.) associated with the mobile device, or a device in communication with the mobile device. The data may also be collected via user input. The mobile application may communicate with the system (e.g., system 300) to provide health/life data associated with the user to the system. In some examples, the user's exercise may indicate a risk. For instance, an individual's who is an avid skier may have a higher risk score than an individual who is a homebody.

In step 712, health/life data may be aggregated and/or analyzed with one or both of home device data and vehicle data to determine risk, etc. This data may then be used to notify a user of any issues associated with home devices, vehicles, etc. in step 714. In step 716, the home device, vehicle and health/life aggregated data may be used to determine/adjust a life insurance rate or premium. For instance, a risk or risk score for a user may be determined based on the health/lifestyle data received, home data received and/or auto data received. In some examples, the risk score for the individual may be based on health/lifestyle data such as level of exercise, frequency of exercise, type of exercise, etc., device data such a maintenance of home devices or lack of maintenance, and/or vehicle data such as driving behaviors (e.g., fast turns, quick stops, quick acceleration, etc.). This information may be used to predict potential losses, such as those based on an individual's behavior, such as theft, liability, etc. In step 718, the customer or user may be notified of any rate or adjustment.

Figure 8:
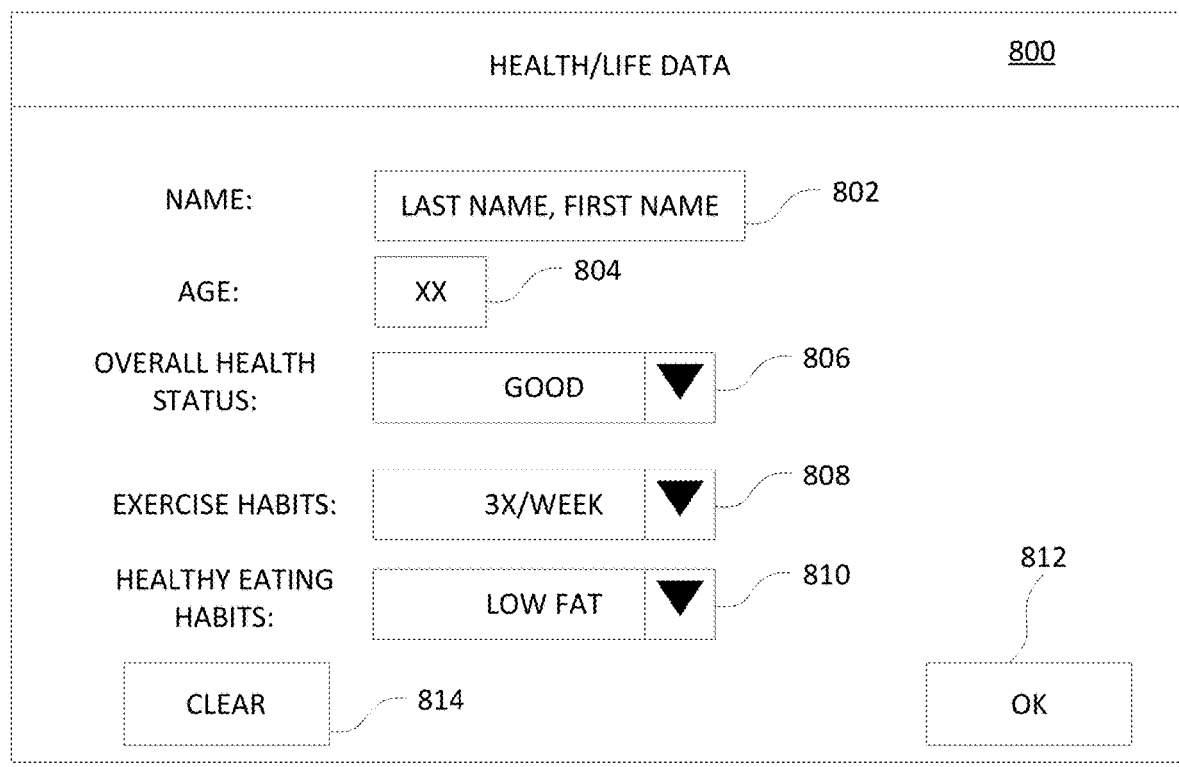
FIG. 8 is an example user interface for receiving user input related to health or lifestyle data of the user according to one or more aspects described herein.

FIG. 8 illustrates one example user interface 800 in which a user or customer of the entity or insurance company may input some basic information related to health or lifestyle habits. The user interface 800 includes field 802 for the name of the user and field 804 for the age of the user. In field 806, a user may identify an overall health status (e.g., poor, good, excellent, etc.). The overall health status in field 806 may be selected from a drop-down menu or may be directly input by the user.

In field 808, a user may identify typical exercise habits. For instance, as shown in FIG. 8, the user exercises approximately three times per week. Field 810 includes user input identifying the diet or eating habits of the user. In field 810, the user has identified a low fat diet. Various other types of diets may be input by the user (e.g., via selection from a drop-down menu), such as low-carb, high protein, low calorie, and the like.

Once the user has input the desired information, he or she may select "OK" option 812 to transmit the information to the system (e.g., system 300 in FIG. 3) for use in setting or adjusting insurance rates. Alternatively, a user may clear all inputs by selecting "CLEAR" option 814.

Various other methods of inputting data (e.g., selection of a radio button associated with options, and the like) may be used without departing from the invention. Further, additional user interfaces may be used to receive input from a user identifying specific health or lifestyle factors, such as example exercise activities, length of time per day of exercise, alcohol consumption, specific caloric intake per day, and the like. These additional user interfaces may be displayed to a user upon user selection of "OK" option 812 or upon the system receiving user input related to health/lifestyle information.

Provided below are various example arrangements of the sensing systems described herein and one or more implementations of such systems. The arrangements described below are merely some examples of systems and implementations, and nothing in the examples should be construed as limiting the invention to only those examples. Rather, various other systems and implementations may be used without departing from the invention.

In one example, data may be received from one or more sensors in communication with or connected to a water line on a refrigerator. In some examples, the sensors may monitor the condition of the water line to determine an approximate age or likelihood of failure of the water line. For instance, a sensor may monitor an amount of flow through a water line (e.g., reduced flow may indicate buildup in the water line which may indicate an age of the water line or likelihood of failure). In another example, a sensor may monitor the flexibility or brittleness of the water line to determine whether the water line material has deteriorated, thus increasing a likelihood of failure. Sensors may transmit this data to the system for analysis and/or aggregation with other types of data to determine a likelihood of failure and/or an insurance rate adjustment. In some examples, the user may be offered a rebate, lower insurance rate, or other incentive to replace the water line prior to failure in order to avoid the failure.

As discussed above, the data collected may be used to determine whether one or more home devices are operating within an expected range. The data may also be used to determine home activity levels, as well as various usage patterns within the home. This information may be useful in providing insurance-based rebates, discounts, etc., as well as aiding users in securing safe, efficient living environments.

In some arrangements, the systems, methods, etc. described herein may be used to proactively make changes to a system that will reduce risk associated with a home, thereby protecting the user, homeowner, etc. For instance, upon detection of home being unoccupied, the system may automatically lock the doors of the home to reduce risk of burglary, vandalism, etc.

In another example, a sensor may determine that a dryer lint basket is full, which may be a fire hazard. Accordingly, an alert may be transmitted to the user to empty the lint basket.

In still another example, a device may determine that a sewage pipe is backing up. In some examples, an alert may be transmitted to the user to notify him/her of the situation.

Sensor/monitor data may also be used to identify and/or prevent or reduce damage from various other issues in a home. For instance, sensor data may indicate movement of a foundation, which may be indicative of foundation issues. In another example, a moisture sensor in a basement may indicate moisture levels in the basement, on walls, etc. that may aid in predicting mold growth.

Various other sensing arrangements of one or more appliances, systems, etc. may be used without departing from the invention.

The systems described herein provide various advantages. For instance, monitoring of one or more home devices, vehicle or driving characteristics and/or health or lifestyle information may aid in identifying potential issues. For instance, monitoring of various systems, etc. may provide an early warning of a potential failure or early warning of an actual failure. For instance, the monitoring system may detect moisture in a home (e.g., a broken pipe, etc.) in which the homeowners are away. In some examples, the system may alert the homeowner who may then have someone shut off the water in order to minimize the damage. In another example, a moisture sensor may detect a small amount of moisture and alert the user before the user would have detected the moisture himself. These early warning systems may reduce or eliminate damage.

Further, monitoring of various driving characteristics or health/lifestyle characteristics may raise awareness. For instance, a user may be unaware that he or she tends to exceed the speed limit when driving. In another example, a user may be unaware that he or she uses his or her mobile device while driving as often as he or she does. Accordingly, monitoring these aspects and notifying the user of the characteristics may raise awareness and cause the user to make safer or healthier decisions.

Further still, the systems described herein may be used with a variety of sensors or sensing devices. In some examples, the user may be able to install the sensors themselves without any additional assistance. Some sensors may be relatively inexpensive which may be another incentive for users to install one or more sensors or monitoring devices.

In addition, a user may select or determine the data that is made available to any entity (e.g., an insurance company) implementing the system. Accordingly, if a user desires to have the data collected in order to monitor his or her home, vehicle, lifestyle, etc. without providing the data to any outside entity, he or she may do so. In another example, a user may choose to provide a portion of the collected data to the entity. The entity may then provide increasing incentives for users who provide more information (e.g., the more data provided to the entity, the greater the incentive or benefit to the user from the entity).

The systems, methods, etc. described herein may aid customers in reducing the risk of potentially costly home disasters, lifestyle issues, etc. The data collected may provide the user with useful information about their homes, lives, etc. that may improve their lives, provide increased safety and efficiency in the home, and the like.

The systems, apparatuses, computer-readable media and methods described above may further provide for increased accuracy in identifying risk associated with a home, user, etc. Accordingly, one or more insurance rates, premiums, and the like, may be adjusted based on this more accurate risk.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A system, comprising:
 a first computing device comprising:
  a processor; and
  memory storing computer-executable instructions that, when executed by the processor, cause the first computing device to:
   receive, from signals transmitted by a sensing device in communication with a home device associated with a user or a vehicle associated with the user, data comprising operating characteristics of the home device or the vehicle;
   analyze the data to determine a likelihood of failure of the home device or the vehicle;
   identify, based on the determined likelihood of failure, an insurance premium;
   generate and transmit an offer to adjust the insurance premium upon repairing or replacing one or more components of the home device or the vehicle having the likelihood of failure;
   determine, after the offer is transmitted, whether a repair or a replacement of the one or more components is made to the home device or the vehicle in accordance with the repairing or the replacing of the one or more components of the home device or the vehicle to adjust the insurance premium and based on the data;

determine, based on the data by the sensing device and in response to determining that the repairing or the replacing is made to the one or more components of the home device or the vehicle, whether the likelihood of failure is reduced;

adjust, in response to determining that the likelihood of failure is reduced based on the data by the sensing device, the insurance premium; and transmit a message notifying of the adjustment to the insurance premium.

2. The system of claim 1, wherein the system further comprises:

a plurality of sensing devices, each sensing device, of the plurality of sensing devices, in communication with a different home device of a plurality of different home devices, and wherein the instructions, when executed by the processor, further cause the first computing device to aggregate data received from the plurality of sensing devices with the data to identify the insurance premium.

3. The system of claim 1, wherein the system further comprises:

a plurality of sensing devices, each sensing device of the plurality of sensing devices in communication with a different component of the vehicle, and wherein the instructions, when executed by the processor, further cause the first computing device to aggregate data received from the plurality of sensing devices with the data to identify the insurance premium.

4. The system of claim 1, wherein the identified insurance premium is a higher insurance premium than a current insurance premium of the user.

5. The system of claim 4, wherein the instructions, when executed by the processor, further cause the first computing device to:

generate an offer to maintain the current insurance premium based on satisfying a first condition; and transmit, to a second computing device associated with the user, a message notifying of the identified insurance premium and the offer to maintain the current insurance premium based on satisfying the first condition.

6. The system of claim 5, wherein the offer to maintain the current insurance premium is based on the operating characteristics of the home device indicating that the home device has been repaired or replaced since a prior receipt of operating characteristics data from the home device.

7. The system of claim 5, wherein the offer to maintain the current insurance premium is based on the operating characteristics of the data indicating that a driving behavior of the user has been modified since a prior receipt of operating characteristics data from the vehicle.

8. The system of claim 1, wherein the sensing device includes a plurality of sensing devices in communication with the home device or the vehicle.

9. The system of claim 1, wherein the likelihood of failure is related to an operation range of the home device or the vehicle.

10. A first computing device comprising:

a processor; and memory storing computer-executable instructions that, when executed by the processor, cause the first computing device to:

receive, from signals transmitted by a sensing device in communication with a home device associated with a user and a vehicle associated with the user, data comprising operating characteristics of the home device and the vehicle;

analyze the data to determine a likelihood of failure of the home device and the vehicle;

identify, based on the determined likelihood of failure, an insurance premium;

generate and transmit an offer to adjust the insurance premium upon repairing or replacing one or more components of the home device and the vehicle having the likelihood of failure;

determine, after the offer is transmitted, whether a repair or replacement of the one or more components is made to the home device and the vehicle in accordance with the repairing or the replacing of the one or more components of the home device and the vehicle to adjust the insurance premium and based on the data received;

determine, based on the data by the sensing device and in response to determining that the repairing or the replacing is made to the one or more components of the home device and the vehicle, whether the likelihood of failure is reduced;

adjust, in response to determining that the likelihood of failure is reduced based on the data by the sensing device, the insurance premium; and transmit a message notifying of the adjustment to the insurance premium.

11. The first computing device of claim 10, wherein the first computing device further comprises:

a plurality of sensing devices, each sensing device, of the plurality of sensing devices, in communication with a different home device of a plurality of different home devices, and wherein the instructions, when executed by the processor, further cause the first computing device to aggregate data received from the plurality of sensing devices with the data to identify the insurance premium.

12. The first computing device of claim 10, wherein the first computing device further comprises:

a plurality of sensing devices, each sensing device of the plurality of sensing devices in communication with a different component of the vehicle, and wherein the instructions, when executed by the processor, further cause the first computing device to aggregate data received from the plurality of sensing devices with the data to identify the insurance premium.

13. The first computing device of claim 10, wherein the identified insurance premium is a higher insurance premium than a current insurance premium of the user.

14. The first computing device of claim 13, wherein the instructions, when executed by the processor, further cause the first computing device to:

generate an offer to maintain the current insurance premium based on satisfying a first condition; and transmit, to a second computing device associated with the user, a message notifying of the identified insurance premium and the offer to maintain the current insurance premium based on satisfying the first condition.

15. The first computing device of claim 14, wherein the offer to maintain the current insurance premium is based on the operating characteristics of the home device indicating that the home device has been repaired or replaced since a prior receipt of operating characteristics data from the home device.

16. The first computing device of claim 14, wherein the offer to maintain the current insurance premium is based on the operating characteristics of the data indicating that a driving behavior of the user has been modified since a prior receipt of operating characteristics data from the vehicle.

17. The first computing device of claim 10, wherein the likelihood of failure is related to an operation range of the home device and the vehicle.

18. A system, comprising:
a first computing device comprising:
a processor; and
memory storing computer-executable instructions that, when executed by the processor, cause the first computing device to:
receive, from signals transmitted by a sensing device in communication with a vehicle, data indicative of one or more characteristics of the vehicle;
analyze the data to determine a likelihood of failure of one or more components of the vehicle;
identify, based on the likelihood of failure of the one or more components of the vehicle, an insurance premium;
generate and transmit an offer to adjust the insurance premium upon repairing or replacing one or more components of the vehicle having the likelihood of failure;
determine, after the offer is transmitted, whether a repair or replacement of the one or more components is made to the vehicle in accordance with the repairing or the replacing of the one or more components of the vehicle to adjust the premium and based on the data received;
determine, based on the data by the sensing device and in response to determining that the repairing or the replacing is made to the one or more components of the vehicle, whether the likelihood of failure is reduced;
adjust, in response to determining that the likelihood of failure is reduced based on the data by the sensing device, the insurance premium; and
transmit a message notifying of the adjustment to the insurance premium.

19. The system of claim 18, wherein the instructions, when executed by the processor, further cause the first computing device to determine the likelihood of failure of the one or more components of the vehicle by:
comparing the data with stored data having characteristics similar to the one or more characteristics;
determining, based on the comparison, a failure rate of the one or more components of the vehicle; and
determining the likelihood of failure of the one or more components of the vehicle based on the failure rate of the one or more components of the vehicle.

20. The system of claim 18, wherein the instructions, when executed by the processor, further cause the first computing device to:
determine an expected failure time period; and
transmit, to a second computing device associated with a user of the vehicle, a message notifying of the likelihood of failure of the one or more components of the vehicle and the expected failure time period.

21. The system of claim 18, wherein the instructions, when executed by the processor, further cause the first computing device to:
generate an offer to receive an incentive upon repairing or replacing the one or more components of the vehicle within a predetermined time period.

22. The system of claim 21, wherein the instructions, when executed by the processor, further cause the first computing device to:
transmit, to a second computing device associated with a user of the vehicle, a message notifying of the identified insurance premium and the offer to receive the incentive upon repairing or replacing the one or more components of the vehicle within the predetermined time period.

23. The system of claim 18, wherein the first data indicates one or more of: an engine status, an oil level, an engine coolant temperature, an odometer reading, a fuel level, an engine revolutions per minute, or a tire pressure.

24. The system of claim 18, wherein the likelihood of failure is related to an operation range of the vehicle.

* * * * *